(12) United States Patent
Chen

(10) Patent No.: US 9,795,220 B1
(45) Date of Patent: Oct. 24, 2017

(54) QUICKLY RELEASED AND FASTENED ADJUSTMENT MECHANISM

(71) Applicant: ATEC INTERNATIONAL TEAM CO., LTD., Taoyuan (TW)

(72) Inventor: Te-Chun Chen, Taoyuan (TW)

(73) Assignee: ATEC INTERNATIONAL TEAM CO., LTD., Taoyuan (TW)

( * ) Notice: Subject to any disclaimer, the term of this patent is extended or adjusted under 35 U.S.C. 154(b) by 0 days.

(21) Appl. No.: 15/149,976

(22) Filed: May 9, 2016

(51) Int. Cl.
*A47C 7/54* (2006.01)
*F16H 31/00* (2006.01)

(52) U.S. Cl.
CPC .............. *A47C 7/54* (2013.01); *F16H 31/002* (2013.01)

(58) Field of Classification Search
CPC .................................. A47C 7/54; F16H 31/002
USPC ............................. 297/411.26, 411.27, 411.37
See application file for complete search history.

(56) References Cited

U.S. PATENT DOCUMENTS

| | | | | |
|---|---|---|---|---|
| 4,536,031 A * | 8/1985 | Latone | ...................... | A47C 7/40 248/337 |
| 5,338,133 A * | 8/1994 | Tornero | ................... | A47C 1/03 297/411.37 X |
| 5,419,617 A * | 5/1995 | Schultz | .................. | A47C 7/546 297/411.27 X |
| 5,462,338 A * | 10/1995 | Baumann | ................. | A47C 1/03 297/411.37 X |
| 5,615,926 A * | 4/1997 | Kanai | ..................... | A47C 7/546 297/411.27 X |
| 5,839,784 A * | 11/1998 | Breen | ..................... | A47C 1/03 297/411.37 X |
| 5,944,387 A * | 8/1999 | Stumpf | ..................... | A47C 1/03 297/411.37 X |
| 6,296,313 B1 * | 10/2001 | Wu | ........................... | A47C 1/03 297/353 |
| 6,409,266 B1 * | 6/2002 | Chen | ....................... | A47C 1/03 297/411.37 X |
| 6,572,195 B1 * | 6/2003 | Lee | .......................... | A47C 1/03 297/411.37 X |
| 6,659,560 B1 * | 12/2003 | Chi | ........................ | A47C 1/023 297/411.37 X |
| 6,802,566 B2 * | 10/2004 | Prince | .................... | A47C 1/023 297/411.27 |

(Continued)

*Primary Examiner* — Rodney B White
(74) *Attorney, Agent, or Firm* — Muncy, Geissler, Olds & Lowe, P.C.

(57) ABSTRACT

A quickly released and fastened adjustment mechanism including a gasket, a first ratchet, a second ratchet, a T-shaped sleeve and a fastener is installed between a sliding member and a fixing member. The first and second ratchets are arranged with annular teeth respectively while the two annular teeth are engaged. The T-shaped sleeve is mounted in the first and second ratchets and against the gasket. The fastener is passed through the T-shaped sleeve, the gasket and the sliding member to be secured on the fixing member. Thus the two corresponding annular teeth are engaged firmly. The height difference between low-level and high-level engagement of the two annular teeth is $H_f$. The sleeved height of the T-shaped sleeve is $D_1$. The total height of the first and second ratchets in the low-level engagement is $D_2$. $D_1 > D_2$. $D_1 - D_2 = G > 0$ and $H_f > G > 0$.

5 Claims, 7 Drawing Sheets

(56) References Cited

U.S. PATENT DOCUMENTS

| | | | | |
|---|---|---|---|---|
| 7,806,481 B2* | 10/2010 | Eberlein | ................. | A47C 1/03 297/411.37 X |
| 8,104,838 B2* | 1/2012 | Tsai | ........................ | A47C 1/03 297/411.37 X |
| 8,449,035 B2* | 5/2013 | Breitkreuz | ............... | A47C 7/42 297/411.37 X |
| 8,459,746 B2* | 6/2013 | Lai | ........................... | A47C 1/03 297/411.27 X |
| 9,578,971 B2* | 2/2017 | Su | ........................... | A47C 1/03 |
| 2010/0123346 A1* | 5/2010 | Lin | ........................ | A47C 1/03 297/411.37 |
| 2011/0109145 A1* | 5/2011 | Jen | ........................ | A47C 7/546 297/411.27 |

* cited by examiner

QUICKLY RELEASED AND FASTENED ADJUSTMENT MECHANISM

BACKGROUND OF THE INVENTION

The present invention relates to a quickly released and fastened adjustment mechanism, especially to a quickly released and fastened adjustment mechanism that is fastened firmly while not in use and is released rapidly during adjustment. The quickly released and fastened adjustment mechanism including a gasket, a first ratchet, a second ratchet, a T-shaped sleeve and a fastener is installed between a sliding member and a fixing member. The adjustment mechanism is quickly released and moved for adjustment of the sliding member and then is fastened again by reverse operation.

An adjustment member is usually disposed between a sliding member and a fixing member. Take a height adjustment mechanism for armrests as an example. Refer to FIG. 1 (only a part of components related to prior arts are used to explain), the sliding member 2 is a horizontal support 205 for an armrest 204 of a chair while the fixing member 3 is a seat 301 of the chair. The horizontal support 205 for the armrest 204 is arranged at a bottom surface 302 of the seat 301 of the chair and an adjustment mechanism is set between the horizontal support 205 for the armrest 204 and the seat 301 of the chair. Thus the armrest 204 is able to be adjusted horizontally relative to the seat 301 after the adjustment mechanism being released (as the double-headed arrow A in figure one indicates). Then the adjustment mechanism has been secured tightly for positioning the armrest 204.

The adjustment mechanism mentioned above mainly includes a first ratchet, a second ratchet and a fastener (such as a screw). A first surface of the first ratchet is directly attached to a bottom surface 202 of a long step-like hole 201 on the horizontal support 205 of the armrest 204 while the second surface of the first ratchet is disposed with annular teeth. A first surface of the second ratchet is arranged with annular teeth corresponding to and engaged with the annular teeth of the first ratchet. The fastener is passed through a center hole of the second ratchet and a center hole of the first ratchet in turn to be secured and fixed on the bottom surface 302 of the seat 301 of the chair. However, the above adjustment mechanism has the following shortcomings while in use. During the assembly, the tightness of the fastener is difficult to control when the fastener is passed through the second ratchet and the first ratchet in to be secured on the bottom surface 302 of the seat 301. Once the fastener is too tight, users (especially women) is unable to easily operate the second ratchet to rotate relative to the first ratchet for changing the engagement state of the two annular teeth between the first and the second ratchets. If the fastener is loose, the horizontal support 205 of the armrest 204 is unable to be fastened on the bottom surface of the seat 301 stably no matter before or after the adjustment. Thus the armrest 204 is unstable or easy to get loose while in use. This significantly affects the use of the armrest 204, reliability and consumers' desire. This has negative effects on the installation of the armrest, mass production and market competitiveness.

SUMMARY OF THE INVENTION

Therefore it is a primary object of the present invention to provide a quickly released and fastened adjustment mechanism that is released quickly during adjustment and is fastened tightly while not being adjusted.

In order to achieve the above object, a quickly released and fastened adjustment mechanism of the present invention is installed between a sliding member and a fixing member and formed by a gasket, a first ratchet, a second ratchet, a T-shaped sleeve and a fastener. The first ratchet and the second ratchet are arranged with annular teeth respectively while the annular teeth are engaged with each other. The T-shaped sleeve is mounted in central holes of the first and the second ratchets and is against the gasket. The fastener is passed through the T-shaped sleeve, the gasket and a long slot of the sliding member to be secured on the fixing member. Thus the two corresponding annular teeth are engaged firmly. The height difference between low-level engagement and high-level engagement of the two corresponding annular teeth is represented by $H_f$ while the sleeved height of the T-shaped sleeve is $D_1$. The total height of the first and the second ratchets in the low-level engagement is $D_2$. $D_1 > D_2$. $D_1 - D_2 = G > 0$ and $H_f > G > 0$. When the second ratchet is rotated relative to first ratchet for changing from the low-level engagement to the high-level engagement or from the high-level engagement to the low-level engagement, the sliding member and the gasket are released and able to be moved for adjustment of the sliding member or fastened. Thus quick operation during adjustment and tightly fastening while not being adjusted can be achieved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
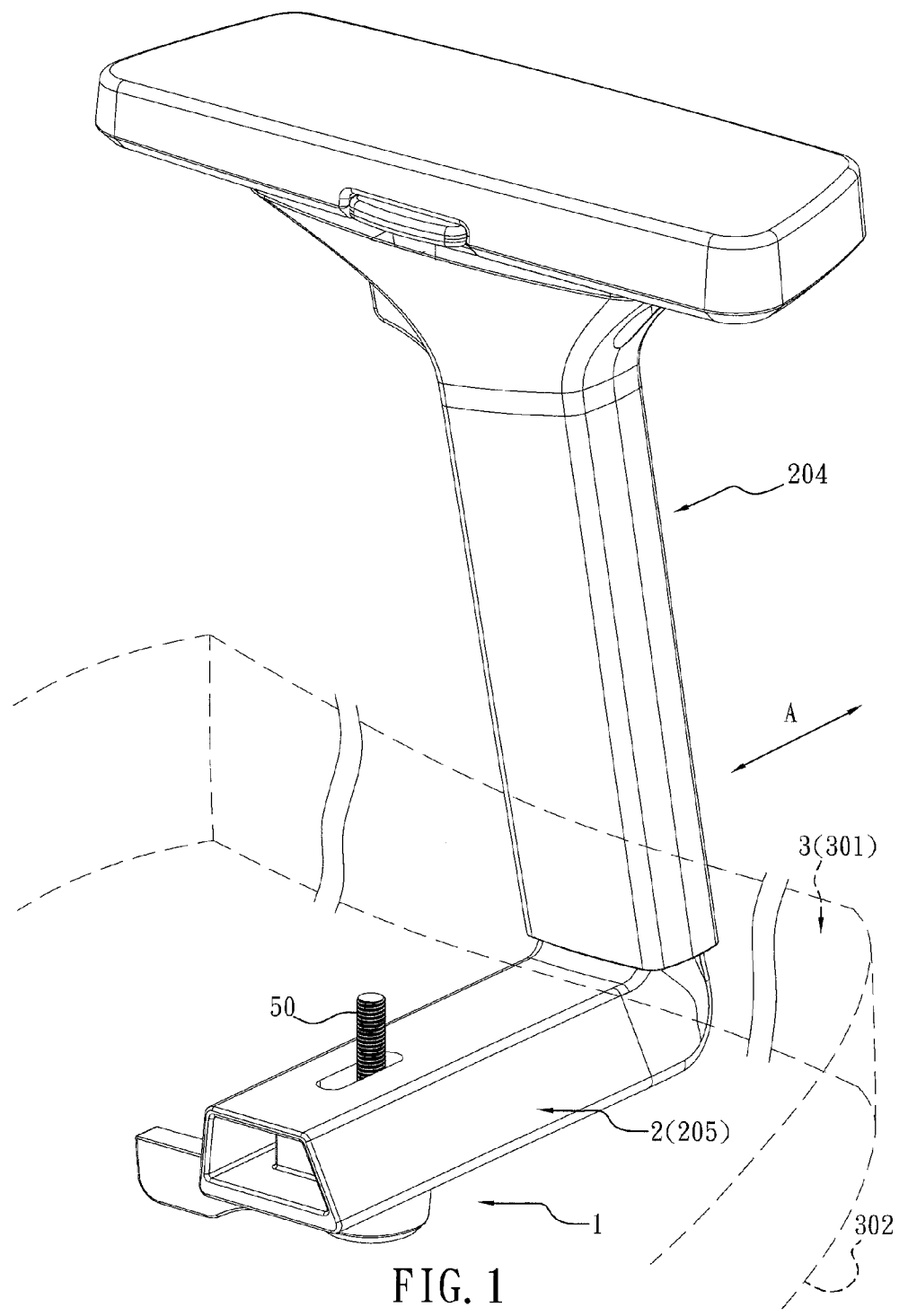
FIG. 1 is a schematic drawing showing an embodiment being set on a horizontal support of an armrest according to the present invention.
Figure 2:
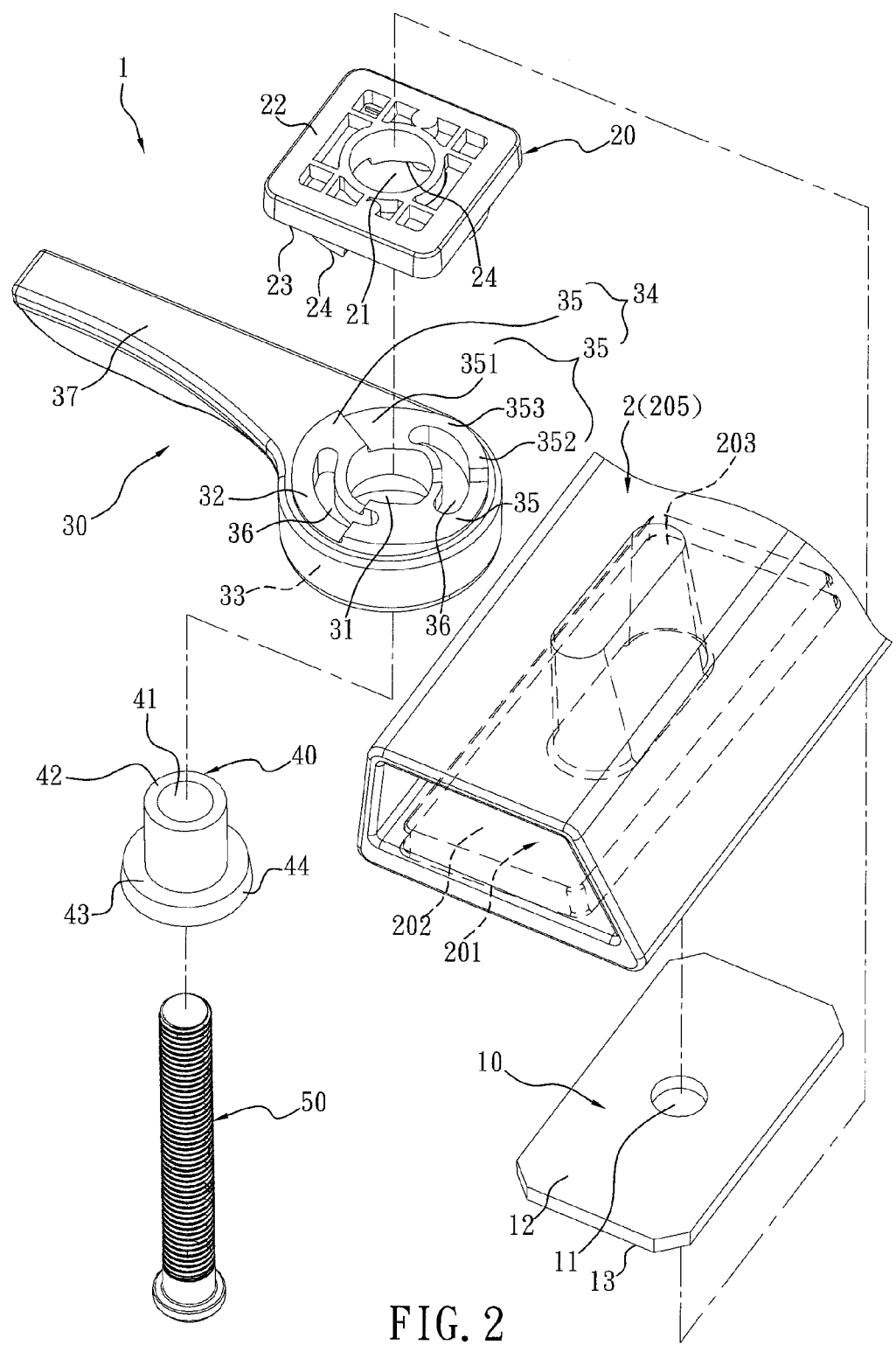
FIG. 2 is an explosive view of the embodiment in FIG. 1 according to the present invention.
Figure 3:
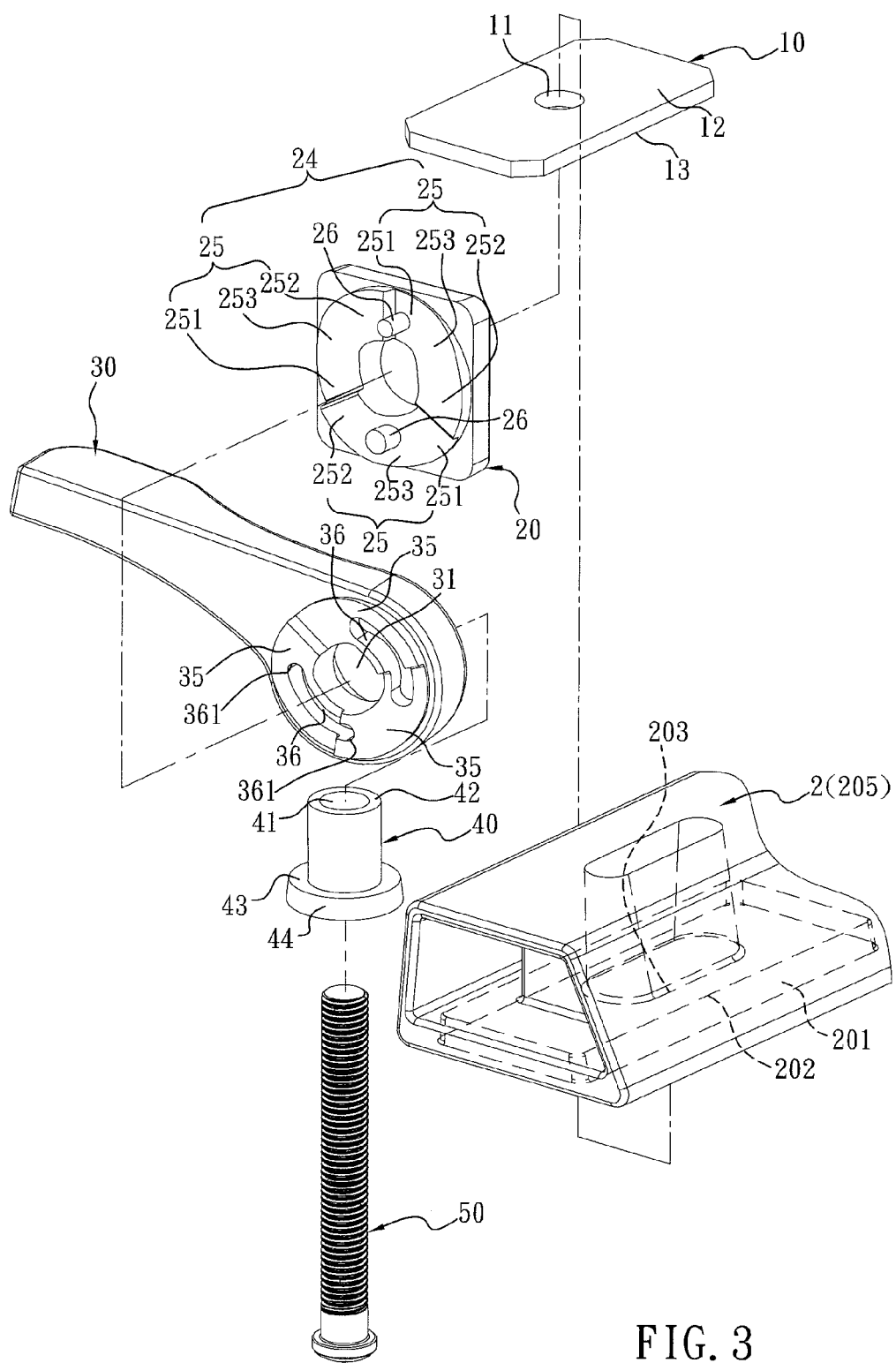
FIG. 3 is another explosive view of the embodiment in FIG. 1 according to the present invention.

Refer to FIG. 1, FIG. 2 and FIG. 3, a quick released and fastened adjustment mechanism 1 of the present invention is set between a sliding member 2 and a fixing member 3 for adjustment of the position of the sliding member 2 relative to the fixing member 3. The adjustment mechanism 1 can be applied to an armrest of a chair. The sliding member 2 can be a horizontal support 205 on the bottom of an armrest 204 of a chair while the fixing member 3 is a seat 301 of the chair. The horizontal support 205 on the bottom of an armrest 204 (the sliding member 2) is set on a bottom surface 302 of the seat 301 (the fixing member 3) by a fastener 50 (such as a screw) while the adjustment mechanism 1 of the present invention is set between the horizontal support 205 (the sliding member 2) and the seat 301 (the fixing member 3). Thus the armrest 204 is able to be moved horizontally relative to the seat 301 (as the double-headed arrow A indicates) after the adjustment mechanism 1 being released. After being adjusted, the adjustment mechanism 1 is fastened for positioning the armrest 204. The adjustment mechanism 1 of the present invention includes a gasket 10, a first ratchet 20, a second ratchet 30, a T-shaped sleeve 40 and a fastener 50.

Figure 4:
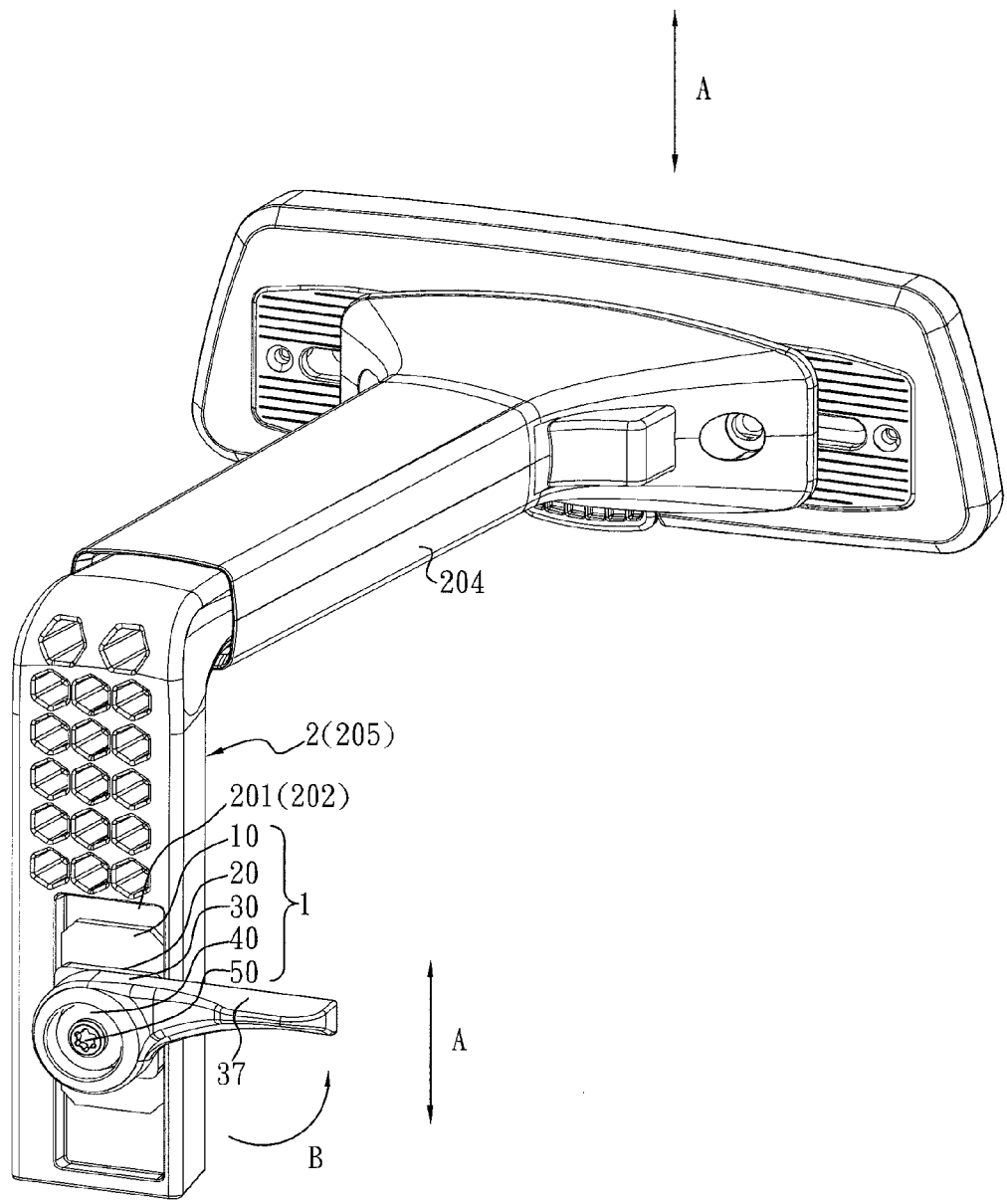
FIG. 4 is a schematic drawing showing the embodiment in FIG. 1 in a released state according to the present invention.
Figure 6:
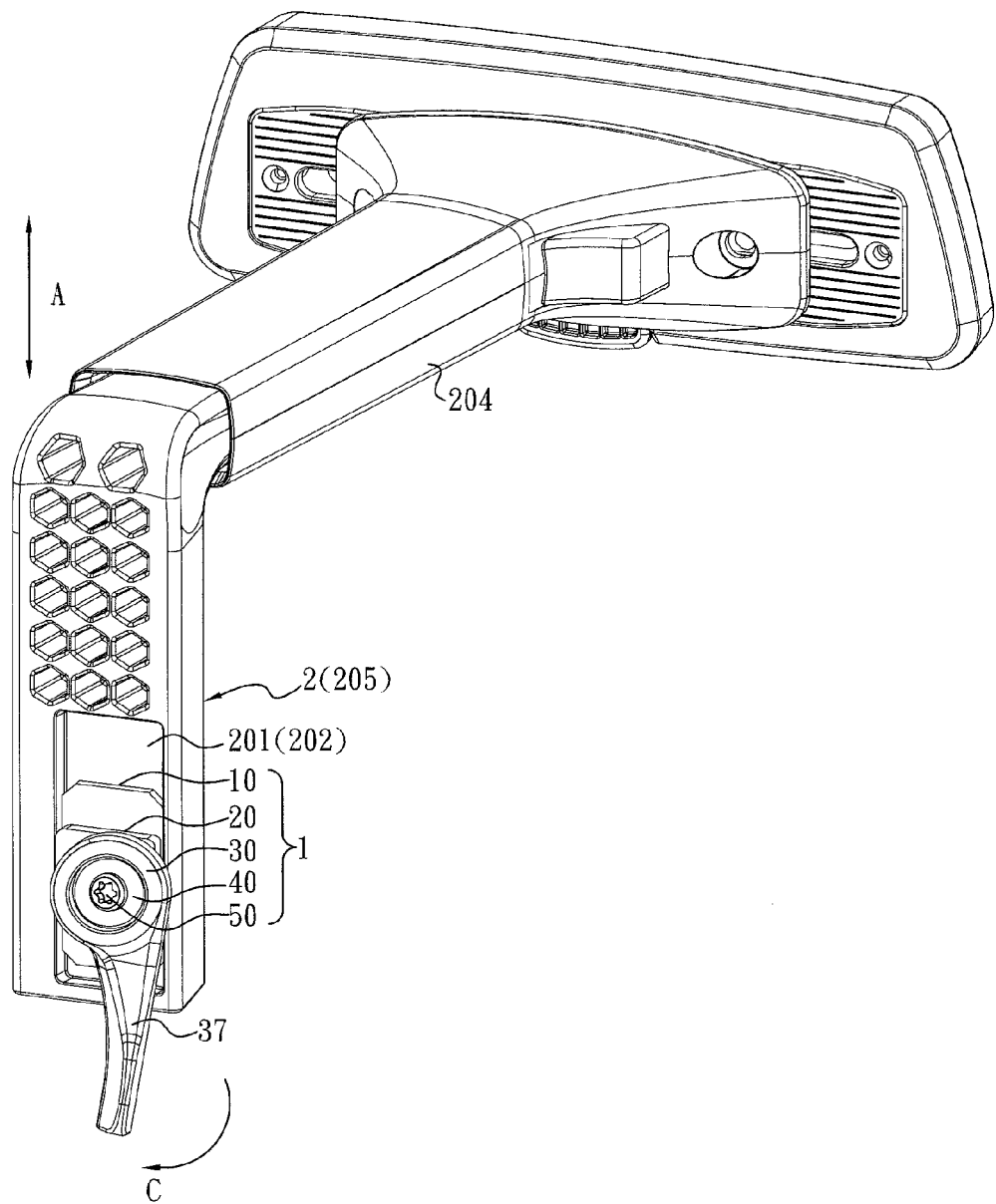
FIG. 6 is a schematic drawing showing the embodiment in FIG. 1 in a fastened state according to the present invention.

The gasket 10 consists of a central hole 11, a first surface 12 and a second surface 13 opposite to the first surface 12. The first surface 12 is in contact with a bottom surface 202 of a long step-like hole 201 of the sliding member 2. The length of the gasket 10 (along the double-headed arrow A) is smaller than the length of the bottom surface 202 of the long step-like hole 201. Thus the sliding member 2 is adjusted and moved relative to the gasket 10 by the long step-like hole 201. As shown in FIG. 4 and FIG. 6, the position of the gasket 10 relative to the long step-like hole 201 has been changed. Moreover, the shape of the gasket 10 is matched the shape of the long step-like hole 201 (or the bottom surface 202). Thus the gasket 10 is moved in the long step-like hole 201 along the length direction, not rotated in the long step-like hole 201.

The first ratchet 20 is composed of a central hole 21, a first surface 22 and a second surface 23 opposite to the first surface 22. The first surface 21 is attached to the second surface 13 of the gasket 10 while the second surface 23 is arranged with annular teeth 24. The annular teeth 24 includes at least one ratchet surface 25 arranged annularly. In this embodiment, the annular teeth 24 includes three ratchet surfaces 25 each of which is formed by a low surface 251, a high surface 252 and a slope 253 extended from the low surface 251 to the high surface 252.

The second ratchet 30 is formed by a central hole 31, a first surface 32 and a second surface 33 opposite to the first surface 32. The first surface 32 is disposed with annular teeth 34 corresponding to and engaged with the annular teeth 24 on the second surface 23 of the first ratchet 20. The annular teeth 34 includes at least one ratchet surface 35 arranged annularly. In this embodiment, the annular teeth 34 includes three ratchet surfaces 35 each of which is formed by a low surface 351, a high surface 352 and a slope 353 extended from the low surface 351 to the high surface 352. Each ratchet surface 35 of the second ratchet 30 is engaged with one of the ratchet surfaces 25 of the first ratchet 20 correspondingly (one-on-one engagement). A low-level engagement (with a lower height) is formed when the low surface 351 of the ratchet surface 35 of the second ratchet 30 is engaged with the high surface 252 of the ratchet surface 25 of the first ratchet 20 while a high-level engagement (with a higher height) is formed when the high surface 352 of the ratchet surface 35 of the second ratchet 30 is rotated to be engaged with the high surface 252 of the ratchet surface 25 of the first ratchet 20.

Figure 5:
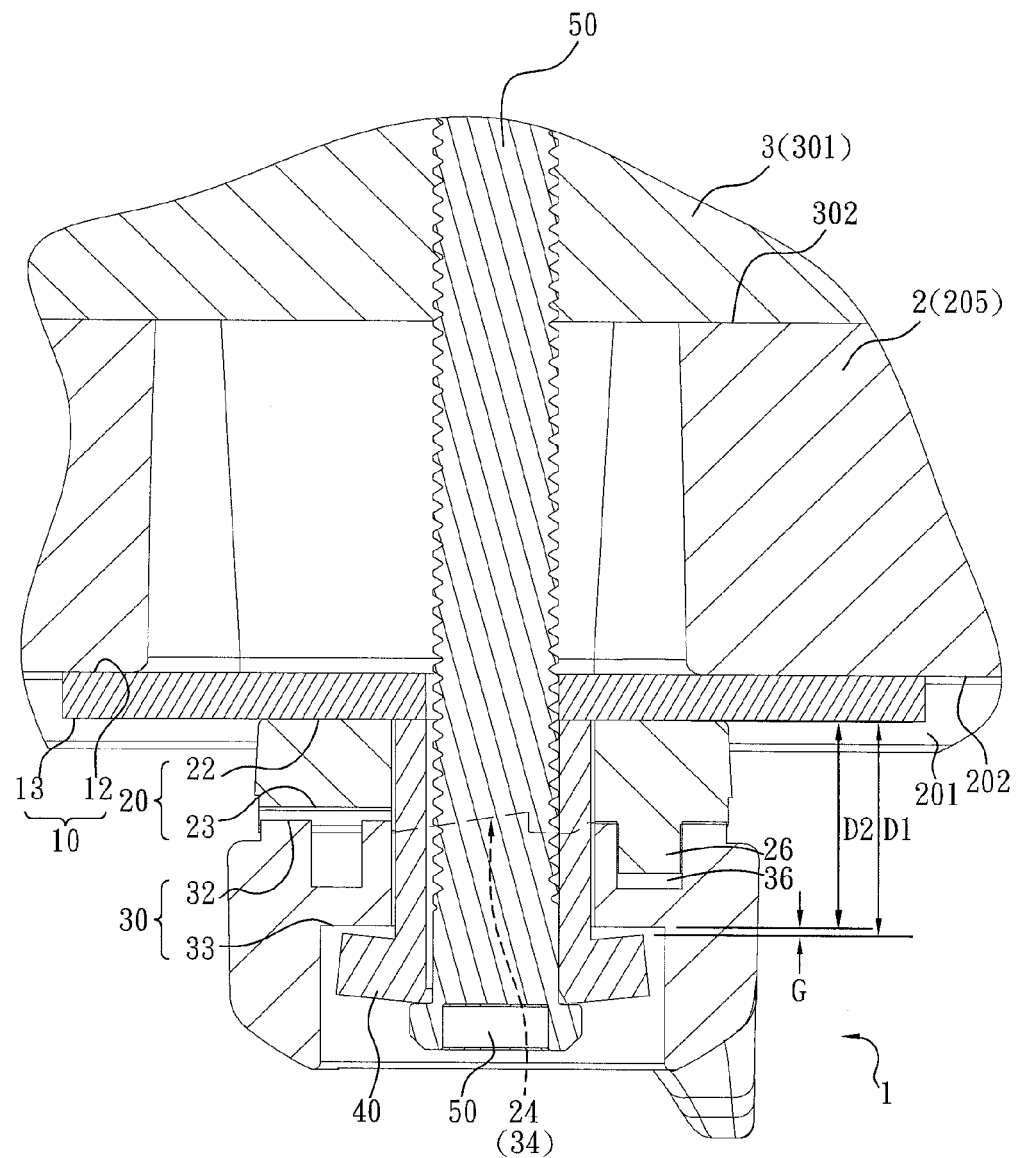
FIG. 5 is a partial cross sectional view of the embodiment in FIG. 4 according to the present invention.
Figure 7:
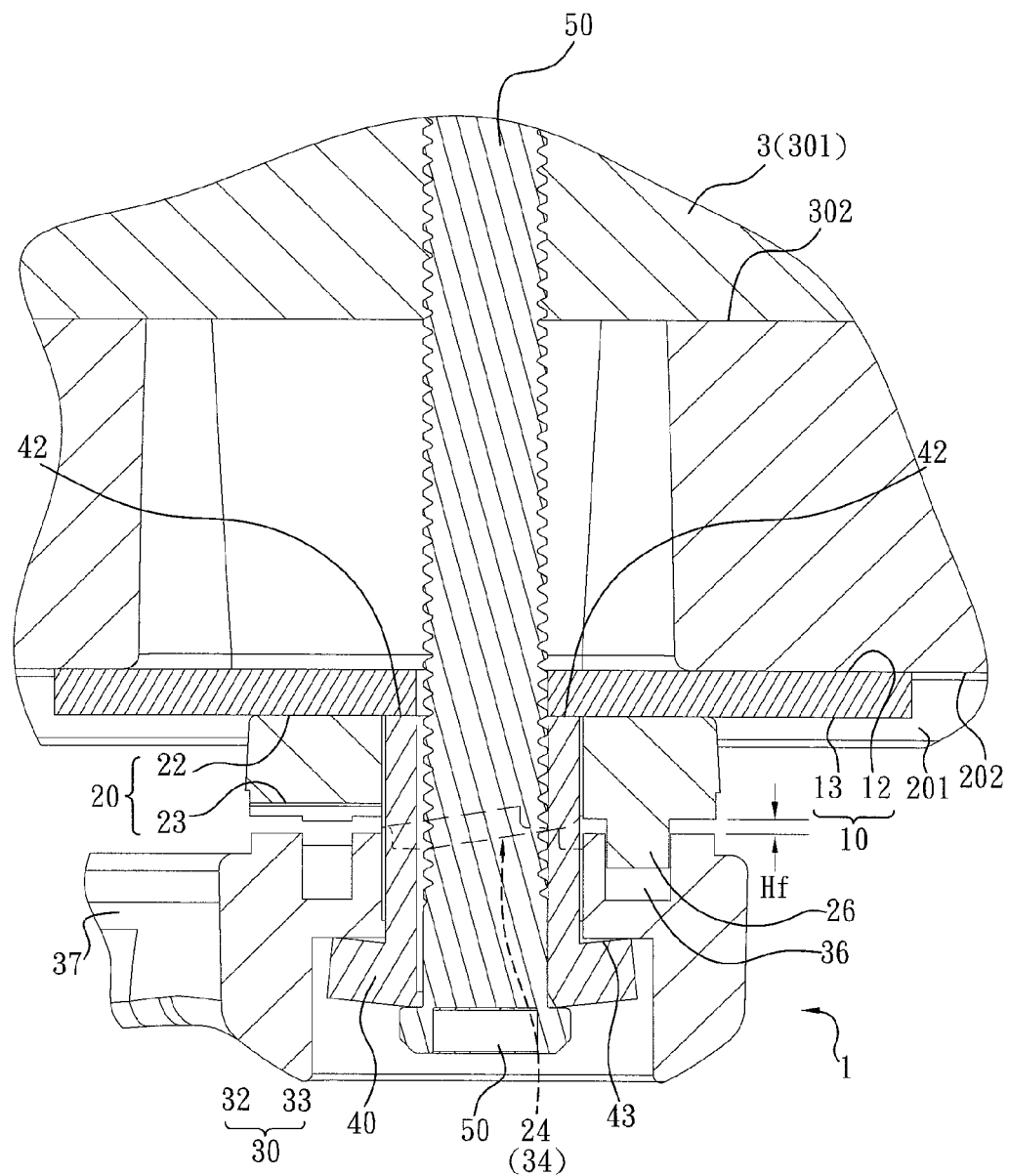
FIG. 7 is a partial cross sectional view of the embodiment in FIG. 6 according to the present invention.

The T-shaped sleeve 40 includes a central hole 41, a first end 42, a second end 43 opposite to the second end 42 and a T-shaped flange 44. The T-shaped sleeve 40 is mounted in the central hole 31 of the second ratchet 30 and the central hole 21 of the first ratchet 20. The first end 42 is in contact with and against the second surface 13 of the gasket 13, as shown in FIG. 5 and FIG. 7. The second end 43 is located on an inner surface of the T-shaped flange 44 and is against the second surface 33 of the second ratchet 30.

The fastener 50 (such as a screw or a bolt) is passed through the central hole 41 of the T-shaped sleeve 40, the central hole 11 of the gasket 10 and a long slot 203 on the bottom surface 202 of the long step-like hole 201 of the sliding member 2 in turn to be secured on the fixing member 3. Thereby the fastener 50 is fixed with respect to the fixing member 3 while the T-shaped sleeve 40, the second ratchet 30, the first ratchet 20 and the gasket 10 are integrated into one part. The second ratchet 30 and the first ratchet 20 are clipped between the second end 43 of the T-shaped sleeve 40 and the second surface 13 of the gasket 10 so that the two corresponding annular teeth 24, 34 are engaged firmly.

The second ratchet 30 is operated to rotate an angle relative to the first ratchet 20 in a clockwise or counterclockwise direction. Thus the two corresponding annular teeth 24, 34 engaged correspondingly are changed from the low-level engagement to the high-level engagement or shifted from the high-level engagement to the low-level engagement. In this embodiment, the two corresponding annular teeth 24, 34 are shifted from the high-level engagement (fastened state) to the low-level engagement (released state) shown in FIG. 5 when the second ratchet 30 is operated to rotate an angle relative to first ratchet 20 in the counterclockwise direction (as the arrow B indicates in FIG. 4). Refer to FIG. 6 and FIG. 7, the two corresponding annular teeth 24, 34 are changed from the low-level engagement (released state) to the high-level engagement (fastened state) when the second ratchet 30 is operated to rotate an angle relative to first ratchet 20 in the clockwise direction (as the arrow C indicates). Moreover, the angle of the second ratchet 30 being rotated relative to the first ratchet 20 is preferred to be set in advance. For example, the preset angle is set as a central angle of a stop groove 36 shown in FIG. 3.

The distance between the second surface 33 of the second ratchet 30 and the first surface 22 of the first ratchet 2 is increased when the two corresponding annular teeth 24, 34 are changed from the low-level engagement (as shown in FIG. 4 and FIG. 5) to the high-level engagement (as shown in FIG. 6 and FIG. 7). The maximum distance increased therebetween is the height difference between the low-level engagement and the high-level engagement of the two corresponding annular teeth 24, 34, and is represented by $H_f$ in FIG. 7. According to the mechanical design of this embodiment, the $H_f$ is about 1.3 mm.

Refer to FIG. 4 and FIG. 5, the height difference between the first end 42 and the second end 43 of the T-shaped sleeve 40 is represented by $D_1$ when the two corresponding annular teeth 24, 34 are in the low-level engagement. $D_1$ can also be considered as the sleeved height of the T-shaped sleeve 40. The distance between the second surface 33 of the second ratchet 30 and the first surface 22 of the first ratchet 2 is represented by $D_2$. $D_1 > D_2$. There is a height difference G between $D_1$ and $D_2$. $D_1 - D_2 = G > 0$. $H_f$ and G satisfies the following condition: $H_f > G > 0$. According to the mechanical design of this embodiment, G is about 0.5 mm when the $H_f$ is about 1.3 mm.

Refer to FIG. 4, the first surface 12 of the gasket 10 is not tightly pressed against the bottom surface 202 of the long step-like hole 201 of the sliding member 2 when the second ratchet 30 is rotated relative to first ratchet 20 counterclockwise (as the arrow B indicates) and shifted from the high-level engagement (fastened state) to the low-level engagement (released state). Thus the sliding member 2 and the gasket 10 are in the released state and able to slide relative to each other. Therefore the sliding member 2 is moved and adjusted relative to the fixing member 3, as the arrow A indicates.

Refer to FIG. 6, the first surface 12 of the gasket 10 is firmly pressed against the bottom surface 202 of the long step-like hole 201 of the sliding member 2 when the second ratchet 30 is rotated relative to first ratchet 20 clockwise (as the arrow C indicates) and changed from the low-level engagement (released state) to the high-level engagement (fastened state). Thus the sliding member 2 and the gasket 10 are in the fastened state and positioned. Therefore the sliding member 2 is unable to be moved and adjusted relative to the fixing member 3. Moreover, a sufficient pressing force is generated between the two corresponding annular teeth 24, 34 due to the 1.3 mm of $H_f$ and 0.5 mm of G when the embodiment is in the high-level engagement (fastened state). Thus the first surface 12 of the gasket 10 is further tightly pressed on the bottom surface 202 of the long step-like hole 201 of the sliding member 2. The magnitude of the pressing force is even so large that the first end 42 of the T-shaped sleeve 40 may be forced to be apart from the second surface 13 of the gasket 10 after deduction of tolerance of the respective part. Thus a gap about 0.5 mm (not shown in figure) between the first end 42 of the T-shaped sleeve 40 and the second surface 13 of the gasket 10 is generated.

Furthermore, refer to FIG. 2 and FIG. 3, a stop mechanism (26, 36) is set between the first ratchet 20 and the second ratchet 30. The stop mechanism (26, 36) is used for limiting the clockwise or counterclockwise rotation of the second ratchet 30 relative to the first ratchet 20. The two stop points (front and rear) and movement of the rotating second ratchet 30 are defined by the stop mechanism (26, 36). In this embodiment, the stop mechanism (26, 36) is formed by at least one stop pin 26 disposed on the second surface 23 of the first ratchet 20 and at least one stop groove 36 arranged at the first surface 32 of the second ratchet 30. As shown in the FIG. 3, there are two stop pins 26 and two corresponding stop grooves 36. The stop grooves 36 can also be set on the second surface 23 of the first ratchet 20 while the stop pins 26 are disposed on the first surface 32 of the second ratchet 30. Each stop groove 36 is a curved groove formed on the first surface 32 of the second ratchet 30, extended to have an angle of rotation (central angle) and two opposite stop ends 361. The stop pin 26 is mounted into the corresponding stop groove 36 and moveable between the two stop ends 361 clockwise or counterclockwise.

Refer to FIG. 2, a handle 37 is disposed on and extended from the second ratchet 30 and is used for users to rotate the second ratchet 30 relative to the first ratchet 20 conveniently. Thus quick release or fasten is achieved.

The present invention has the following advantages compared with prior arts. Firstly, T-shaped sleeve 40, the second ratchet 30, the first ratchet 20 and the gasket 10 are integrated into one part by the fastener 50 and are set between the sliding member 2 and the fixing member 3 under the condition that $H_f > G > 0$. The design is beneficial to the assembly and the problem of difficulty in control of fastening strength of the fastener in the prior art can also be avoided.

Secondly, the second ratchet 30 and the first ratchet 20 can be firmly clipped between the second end 43 of the T-shaped sleeve 40 and the second surface 13 of the gasket 10 after being assembled under the condition that $H_f > G > 0$ while the corresponding annular teeth 24, 34 between the sliding member 2 and the fixing member 3 are maintained at the engaged state, without separating from each other. Thereby the sliding member 2 and the fixing member 3 are fixed stably, without being loosened. The problem of the prior arts that the sliding member 2 and the fixing member 3 are loosened easily after being assembled can be avoided.

Lastly the user can release the sliding member 2 from the fixing member 3, adjust the position of the sliding member 2 relative to the fixing member 3 and then fasten the sliding member 2 for positioning quickly and conveniently under the condition that $H_f > G > 0$. Thus the efficiency of the present invention is improved and this is beneficial to mass production and market competitiveness.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A quickly released and fastened adjustment mechanism installed between a sliding member and a fixing member for adjustment of the released sliding member with respect to the fixing member and fastening of the sliding member after adjustment comprising:

a gasket having a central hole, a first surface in contact with a bottom surface of a long stepped hole of the sliding member, and a second surface opposite to the first surface;

a first ratchet that includes a central hole, a first surface attached to the second surface of the gasket, a second surface opposite to the first surface and disposed with annular teeth; the annular teeth having at least one ratchet surface that is arranged annularly and including a low surface, a high surface, and a slope extended from the low surface to the high surface;

a second ratchet including a central hole, a first surface disposed with annular teeth corresponding to and engaged with the annular teeth on the second surface of the first ratchet, and a second surface opposite to the first surface; the annular teeth having at least one ratchet surface that is arranged annularly and including a low surface, a high surface, and a slope extended from the low surface; the ratchet surface of the second ratchet is engaged with the ratchet surface of the first ratchet in a one-on-one manner; the low surface of the ratchet surface of the second ratchet being engaged with the high surface of the ratchet surface of the first ratchet to form a low-level engagement; the high surface of the ratchet surface of the second ratchet being rotated and engaged with the high surface of the ratchet surface of the first ratchet to form a high-level engagement;

a T-shaped sleeve that includes a central hole, a first end against the second surface of the gasket, a T-shaped flange, and a second end opposite to the second end, located on an inner surface of the T-shaped flange and against the second surface of the second ratchet; and a fastener that is passed through the central hole of the T-shaped sleeve, the central hole of the gasket and a long slot on the bottom surface of the long stepped hole of the sliding member in turn to be secured on the fixing member; thus the fastener is fixed relative to the fixing member while the T-shaped sleeve, the first ratchet, the first ratchet and the gasket are integrated; wherein the second ratchet and the first ratchet are clipped between the second end of the T-shaped sleeve and the second surface of the gasket, and the annular teeth of the first ratchet and the annular teeth of the second ratchet are engaged firmly;

wherein the second ratchet is operated to rotate an angle relative to the first ratchet in a clockwise or counterclockwise direction so that the annular teeth of the first ratchet and the annular teeth of the second ratchet engaged correspondingly are changed from the low-level engagement to the high-level engagement or from the high-level engagement to the low-level engagement;

wherein a distance between the second surface of the second ratchet and the first surface of the first ratchet is increased when the annular teeth of the first ratchet and the annular teeth of the second ratchet engaged correspondingly are changed from the low-level engagement to the high-level engagement; the maximum distance increased therebetween is height difference between the low-level engagement and the high-level engagement of the annular teeth of the first ratchet and the annular teeth of the second ratchet, and is represented by $H_f$; wherein a height difference between the first end and the second end of the T-shaped sleeve, a sleeved height of the T-shaped sleeve, is represented by $D_1$ when the annular teeth of the first ratchet and the annular teeth of the second ratchet are in the low-level engagement while a distance between the second surface of the second ratchet and the first surface of the first ratchet is represented by $D_2$; wherein $D_1 > D_2$, $D_1 - D_2 = G > 0$; $H_f$ and G satisfies the following condition: $H_f > G > 0$;

wherein the first surface of the gasket is not tightly pressed against the bottom surface of the long stepped hole of the sliding member when the second ratchet is rotated relative to first ratchet and changed from the high-level engagement to the low-level engagement; thus the sliding member and the gasket are released state and able to slide relative to each other; therefore the sliding member is moved and adjusted relative to the fixing member; wherein the first surface of the gasket is tightly pressed against the bottom surface of the long stepped hole of the sliding member when the second ratchet is rotated relative to first ratchet and changed from the low-level engagement to the high-level engagement; thus the sliding member and the gasket are fastened and positioned; therefore the sliding member is unable to be moved and adjusted relative to the fixing member, wherein a stop mechanism is set between the first ratchet and the second ratchet; the stop mechanism is used for limiting two stop points and movement therebetween of clockwise or counterclockwise rotation of the second ratchet relative to the first ratchet, and wherein the stop mechanism includes at least one stop pin disposed on the second surface of the first ratchet and at least one stop groove arranged at the first surface of the second ratchet; wherein the stop groove is extended to have an angle of rotation and two opposite stop ends; the stop pin is mounted into the stop groove correspondingly and moveable between the two stop ends.

2. The device as claimed in claim 1, wherein a handle is set on and extended from the second ratchet for being operated to rotate the second ratchet relative to the first ratchet.

3. The device as claimed in claim 1, wherein the sliding member is a horizontal support on a bottom of an armrest of a chair while the fixing member is a seat of the chair; the horizontal support on the bottom of the armrest is set on a bottom surface of the seat of the chair so that the armrest is able to be moved and adjusted horizontally relative to the seat after the adjustment mechanism being released and then the adjustment mechanism is fastened for positioning the armrest.

4. The device as claimed in claim 3, wherein $H_f$ is about 1.3 mm and G is about 0.5 mm.

5. The device as claimed in claim 1, wherein a shape of the gasket is matched to a shape of the long stepped hole of the sliding member so that the gasket is only moved in the long stepped hole, not rotated in long stepped hole while the second ratchet is operated to rotate.

* * * * *